(12) United States Patent
Shetty

(10) Patent No.: US 10,348,826 B2
(45) Date of Patent: Jul. 9, 2019

(54) PATTERN-BASED OBJECT SERVING

(71) Applicant: Red Hat, Inc., Raleigh, NC (US)

(72) Inventor: Deepak Chandrashekhar Shetty, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 292 days.

(21) Appl. No.: 14/542,813

(22) Filed: Nov. 17, 2014

(65) Prior Publication Data

US 2016/0142484 A1    May 19, 2016

(51) Int. Cl.
*G06F 9/445*    (2018.01)
*H04L 29/06*    (2006.01)
*H04L 29/08*    (2006.01)

(52) U.S. Cl.
CPC ...... *H04L 67/1097* (2013.01); *G06F 9/44536* (2013.01); *H04L 67/42* (2013.01)

(58) Field of Classification Search
USPC .......................................................... 709/203
See application file for complete search history.

(56) References Cited

U.S. PATENT DOCUMENTS

| | | | | |
|---|---|---|---|---|
| 5,339,435 A * | 8/1994 | Lubkin | ...................... | G06F 8/71 709/220 |
| 8,195,769 B2 | 6/2012 | Miloushev et al. | | |
| 8,489,709 B2 | 7/2013 | Matsuzawa | | |
| 8,589,439 B2 | 11/2013 | Coldicott et al. | | |
| 9,355,681 B2 * | 5/2016 | Gordon | ............ | H04N 21/23412 |
| 2007/0282951 A1 * | 12/2007 | Selimis | .................... | H04L 67/06 709/205 |
| 2008/0052514 A1 * | 2/2008 | Nakae | .................. | G06F 21/6218 713/168 |
| 2009/0106234 A1 * | 4/2009 | Siedlecki | .......... | G06F 17/30864 |
| 2009/0205018 A1 * | 8/2009 | Ferraiolo | ............ | G06F 21/6218 726/1 |
| 2011/0246493 A1 | 10/2011 | Walker | | |
| 2012/0331249 A1 * | 12/2012 | Benjamin | ............. | G06F 3/0607 711/162 |
| 2013/0238805 A1 * | 9/2013 | Catrein | ................. | G06F 9/5072 709/226 |
| 2013/0254634 A1 | 9/2013 | Luby et al. | | |
| 2014/0188868 A1 | 7/2014 | Hunter et al. | | |
| 2014/0250281 A1 | 9/2014 | Rao et al. | | |
| 2016/0062794 A1 * | 3/2016 | Charania | ........... | G06F 17/30923 718/102 |

OTHER PUBLICATIONS

Isaila, Florin, "An Overview of File System Architectures", Algorithms for Memory Hierarchies, pp. 273-289, 2003, U. Meyer et al. (Eds.), LNCS, vol. 2625, Springer, Berlin, Heidelberg.

(Continued)

*Primary Examiner* — Umar Cheema
*Assistant Examiner* — John Fan
(74) *Attorney, Agent, or Firm* — Lowenstein Sandler LLP

(57) ABSTRACT

Systems and methods for pattern-based object serving. An example method may comprise: receiving, by a processing device, an object access pattern and an identifier of an object container to be associated with object access requests by a client; receiving an object access request from the client; selecting an object in view of the object container and the object access pattern; and providing an identifier of the object to the client.

20 Claims, 6 Drawing Sheets

(56) References Cited

OTHER PUBLICATIONS

"PAT.File Storage", from DYAINFRAWiki, 5 pages (Last modified Mar. 29, 2012) https://dya-knowledge.sogeti.nl/dir/PAT.File_Storage.

Weil, Sage A., et al. "Dynamic Metadata Management for Petabyte-scale file Systems", University of California, Santa Cruz, 2004 12 pages http://ceph.com/papers/weil-mds-sc04.pdf.

* cited by examiner

PATTERN-BASED OBJECT SERVING

TECHNICAL FIELD

The present disclosure is generally related to computer systems, and is more specifically related to pattern-based object serving.

BACKGROUND

A server (e.g., a file system server or an object storage server) may respond to input/output (I/O) requests originated by clients running on a plurality of client computer systems. "Computer system" herein shall refer to a system comprising one or more processors, one or more memory devices, and one or more I/O interfaces.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
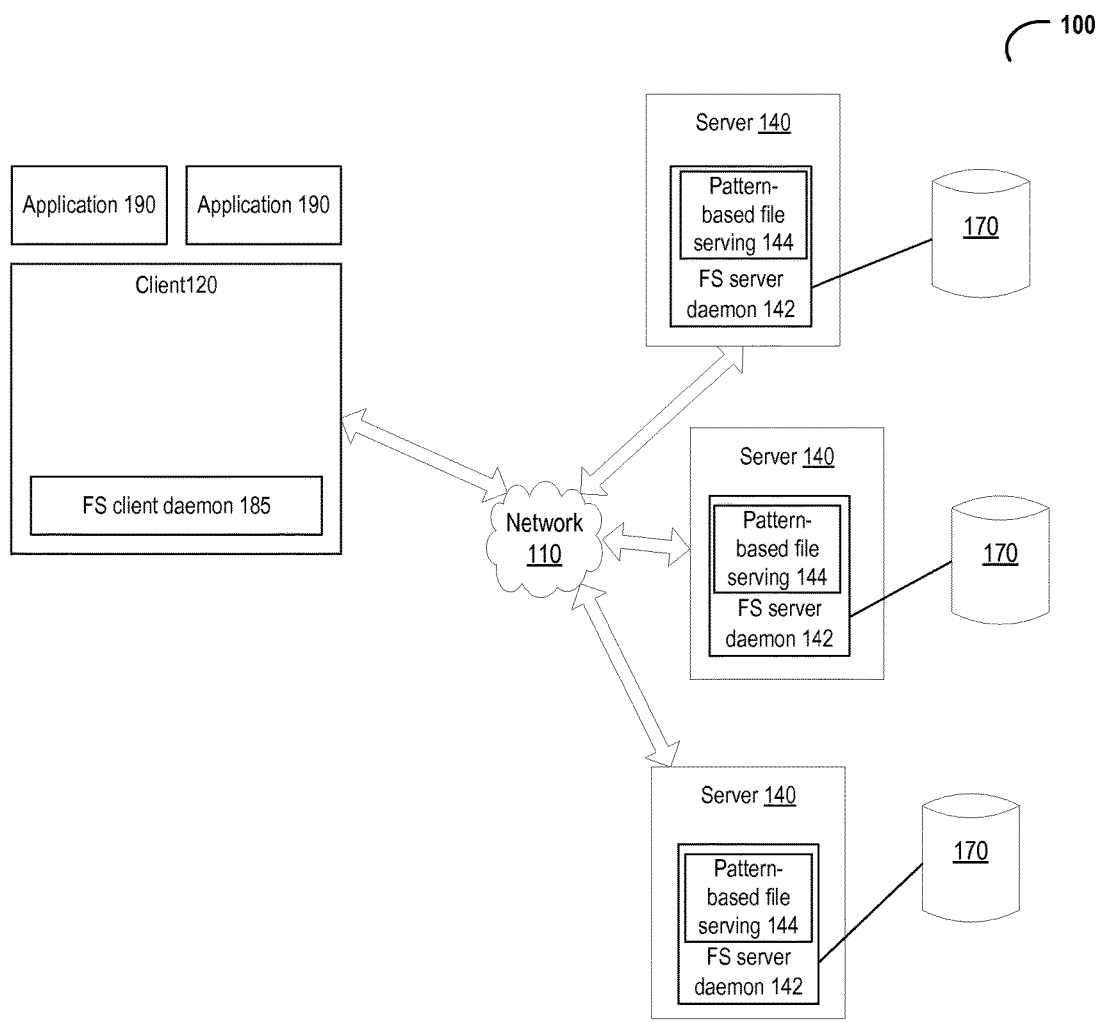
FIG. 1 schematically depicts component diagrams of example computer systems, in accordance with one or more aspects of the present disclosure.

Described herein are methods and systems for pattern-based object serving implemented by file system servers or object storage severs.

"Object" herein shall refer to a file stored by a file system or an object stored by an object-based storage system. An object may be referenced by one or more identifiers, including one or more object names (e.g., file names or names of an object stored by an object-based storage system). Various applications executed by client computer systems may need to access objects in accordance with a certain pattern, which may be based on the object name and/or object attributes (e.g., a file name and/or file attributes, or a name and/or attributes of an object stored by an object-based storage system). In an illustrative example, a media player may need to access a plurality of digital content files in a random order. In another illustrative example, a backup application may need to access most recently modified files (e.g., the files that have been modified after the last backup). In yet another illustrative example, a file retention policy enforcing application may need to archive or delete least recently modified files (e.g., the files that have been modified before a certain date and time). In various implementations, the above referenced examples may be implemented by a file system or by an object-based storage system.

In common implementations, such pattern-based file retrievals may be implemented by the application level logic that resides above the file system (e.g., by a shell script, a run-time library, or application code). However, as the pattern-based access is based on the file metadata (e.g., file name and/or file attributes) that would need to be retrieved from the file system (e.g., using appropriate system calls), the logic implementing pattern-based file serving may, in accordance with one or more aspects of the present disclosure, be more efficiently implemented at the file server level (e.g., a file system server), rather than at the file system client level. Similarly, for object-based storage systems, as the pattern-based access is based on the object metadata (e.g., object name and/or object attributes) that would need to be retrieved from the object-based storage system, the logic implementing pattern-based object serving may, in accordance with one or more aspects of the present disclosure, be more efficiently implemented at the object storage server level (e.g., an object storage server), rather than at the object storage client level.

In certain implementations, the pattern-based object serving logic may be at least partially implemented by one or more servers (e.g., file system servers or object storage servers). The pattern-based file serving logic may also be at least partially implemented by a file system driver residing at a file system client. In accordance with one or more aspects of the present disclosure, the pattern-based file serving logic may be implemented by a system call (e.g., a dedicated pattern-based file access system call or an ioctl call with a certain request code indicating pattern-based file access).

A client application may specify the desired object name pattern (e.g., a file name pattern or a name pattern of objects stored by an object-based storage system). In various illustrative examples, the object access pattern may be defined using a certain syntax (e.g., using wildcard characters or regular expressions) applied to one or more operands represented by the object name and/or object attributes. In various illustrative examples, the object access pattern may be specified via a configuration file or via a system call parameter.

In certain implementations, the client applications may further specify an identifier of an object container (e.g., the root directory) to be associated with object access requests originated by the client application. In various illustrative examples, the object container may be specified via a configuration file or via a system call parameter.

Responsive to receiving the object access request, a component implementing the pattern-based object serving logic (e.g., a file system component or an object-based storage system component) may select, based on the specified pattern, one or more objects residing within the specified object container, e.g., within the directory sub-tree specified by the root directory. The object identifier, such as the file name or file descriptor, may be returned to the client.

Various aspects of the above referenced methods and systems are described in details herein below by way of examples, rather than by way of limitation.

FIG. 1 schematically depicts a high-level component diagram of an example distributed file system 100 providing pattern-based file serving in accordance with one or more aspects of the present disclosure. In certain implementations, distributed file system 100 may further support data replication, load balancing, and other functions related to providing file system services.

In an illustrative example, a file system may be provided by a network attached storage (NAS) system comprising one or more server computer systems each coupled to one or more persistent data storage devices, such as magnetic or optical storage disks, solid-state drives (SSDs), etc. Distributed file system 100 may include one or more file system servers 140 configured to individually and/or collectively service file access request (such as requests to create, access or modify a specified file). In an illustrative example of FIG. 1, each file system server 140 may be communicatively coupled to one or more data storage devices 170.

One or more client computers 120 may be communicatively coupled, e.g., over a network 110, to one or more file system servers 140. Network 110 may be provided by one or more local area networks, one or more wide area networks, or any combination thereof. Client computer 120 may be provided by a computer system including a processor, a memory, and at least one communication interface (the above noted components of client computer 120 are omitted from FIG. 1). Client computer 120 can execute one or more applications 190.

Server 140 may run a file system server daemon (or any other component such as a module or program) 142. In certain implementations, file system server daemon 142 may export a local file system to clients 120 as a volume accessible by the clients. File system server daemon 142 may comprise a pattern-based file serving module 144 operating in accordance with one or more aspects of the present disclosure.

File system client 185 running on client computers 120 may connect to servers via an application-level protocol implemented over TCP/IP, InfiniBand or other transports, to perform various file I/O operations with respect to files stored by one or more file servers 140.

In an illustrative example, a client application 190 may comprise a media player component that may be configured to access a plurality of digital content files in a random order. In another illustrative example, a client application 190 may comprise a file system backup component that may be configured to access most recently modified files (e.g., the files that have been modified after the last backup). In yet another illustrative example, a client application 190 may comprise a file retention policy enforcing component that may be configured to archive or delete least recently modified files (e.g., the files that have been modified before a certain date and time).

A client application 190 may specify the desired file access pattern. In various illustrative examples, the file access pattern may be defined using a certain syntax (e.g., using wildcard characters or regular expressions) applied to one or more operands represented by the file name and/or file attributes. In various illustrative examples, client application 190 may specify the file access pattern via a configuration file or via a system call parameter.

In various illustrative examples, the star ('☆') symbol in a file access pattern matches any string of a file name for files residing within a given directory. The question mark ('?') symbol in a file access pattern matches any character of a file name for files residing within a given directory. The left square bracket ('[') symbol in a file access pattern designates a start of a character class definition string. A character class definition string may comprise one or more characters delimited by square brackets, and may be used to match any single character within the class. The character definition class string ends with the right square bracket (']') symbol. A character class definition string may contain multiple ranges of the form "a-f", which is equivalent to "abcdef." If the first character after the opening left square bracket is an exclamation mark symbol ('!'), it negates the character class definition, making it match any single character not comprised by the class.

In certain implementations, client application 190 may further specify an identifier of the root directory to be associated with file access requests originated by the client application. In various illustrative examples, client application 190 may specify the root directory via a configuration file or via a system call parameter.

Responsive to receiving the file access request originated by a client application 190, a file system server implementing the pattern-based file serving logic 144 may select, based on the specified pattern, one or more files residing in the directory sub-tree specified by the root directory. The file identifier (e.g., the file name or file descriptor) may be returned to the client.

In certain implementations, the file system configuration information may comprise the system topology information (e.g., the number of servers, the server connection information, replica relationships between the servers, etc.). A file system client may request the file system configuration information from an external computer system (e.g., a file system server or a peer client). Responsive to receiving the requested configuration information, the file system client may construct a configuration graph reflecting the distributed file system configuration. The file system configuration information may be represented by a configuration graph, which may be provided by a tree-like data structure comprising a root node corresponding to the file system mount point, two or more terminal ("leaf") nodes corresponding to the file system servers, and two or more intermediate nodes referred to as "translators," as schematically illustrated by FIG. 2.

Figure 2:
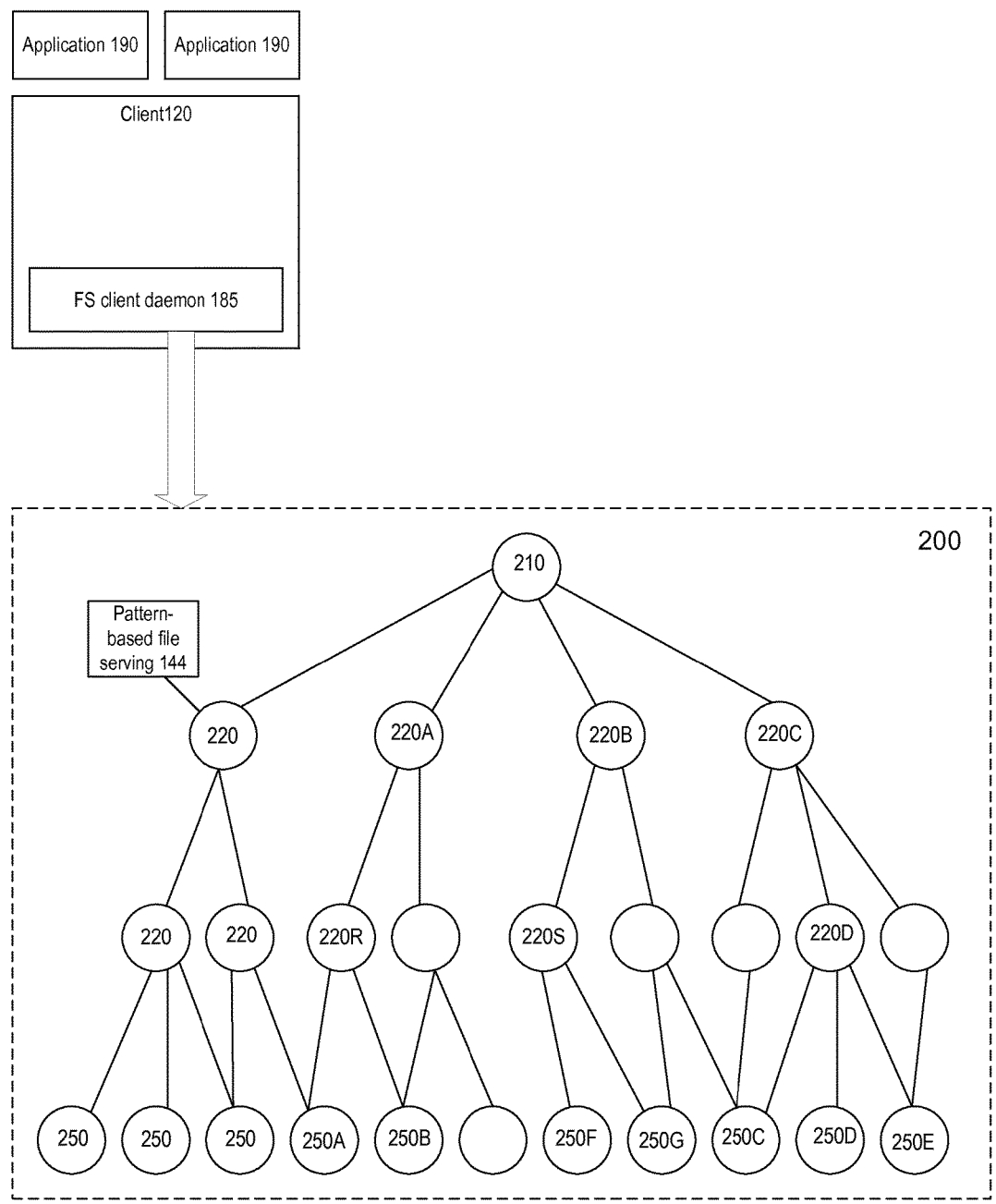
FIG. 2 schematically illustrates an example configuration graph of a distributed file system an example method for pattern-based file serving, in accordance with one or more aspects of the present disclosure.

FIG. 2 schematically illustrates an example distributed file system configuration graph, in accordance with one or more aspects of the present disclosure. File system client 120 may employ file system configuration graph 200 to process file access requests issued, e.g., by one or more applications 190 executed by the client computer system. Each file access request may traverse the graph from the mount point to one or more leaf nodes via one or more translators 220, 250, which may process I/O requests and responses traversing the graph.

As schematically illustrated by FIG. 2, a file system configuration graph 200 can be represented by a hierarchical data structure comprising a set of linked nodes. In certain implementations, file system configuration graph 200 may be represented by a tree comprising a root node 210 corresponding to the file system mount point, two or more leaf nodes 250 corresponding to the file system servers, and two or more intermediate nodes 220 also referred to as "translators." The translators may process I/O requests and responses traversing the graph, as described in more details herein below. Responsive to constructing the configuration graph, the file system client may create connections to the file system servers 140 referenced by the leaf nodes of the graph, thus completing the file system mounting process.

The client may employ the configuration graph to process file access requests issued by applications executed by the client computer system. Each file access request may traverse the graph from the mount point to one or more leaf nodes via one or more translators. Responses corresponding to the file access requests may traverse the graph following the reverse route.

In an illustrative example, a replicate translator 220R may receive a write request from its parent node 220A and perform corresponding write operations on two or more of its child nodes 250A-250B. In another illustrative example, a distribute translator 220D may receive a write request from its parent node 220C and select, among its child nodes 250C-250E, a node to perform the corresponding write operation. In a further illustrative example, a stripe translator 220S may receive a write request from its parent node 220B and split the write request into two or more write requests to be processed by two or more child nodes 220E-220G.

In certain implementations, pattern-based file serving logic 144 may be implemented by one or more translators. In an illustrative example, responsive to receiving a file access request, a file retrieval translator 220 implementing the pattern-based file serving logic may select, based on the pattern specified by the file system client, one or more files, and return the file identifier (e.g., the file name or file descriptor) to the file system client.

Figure 3:
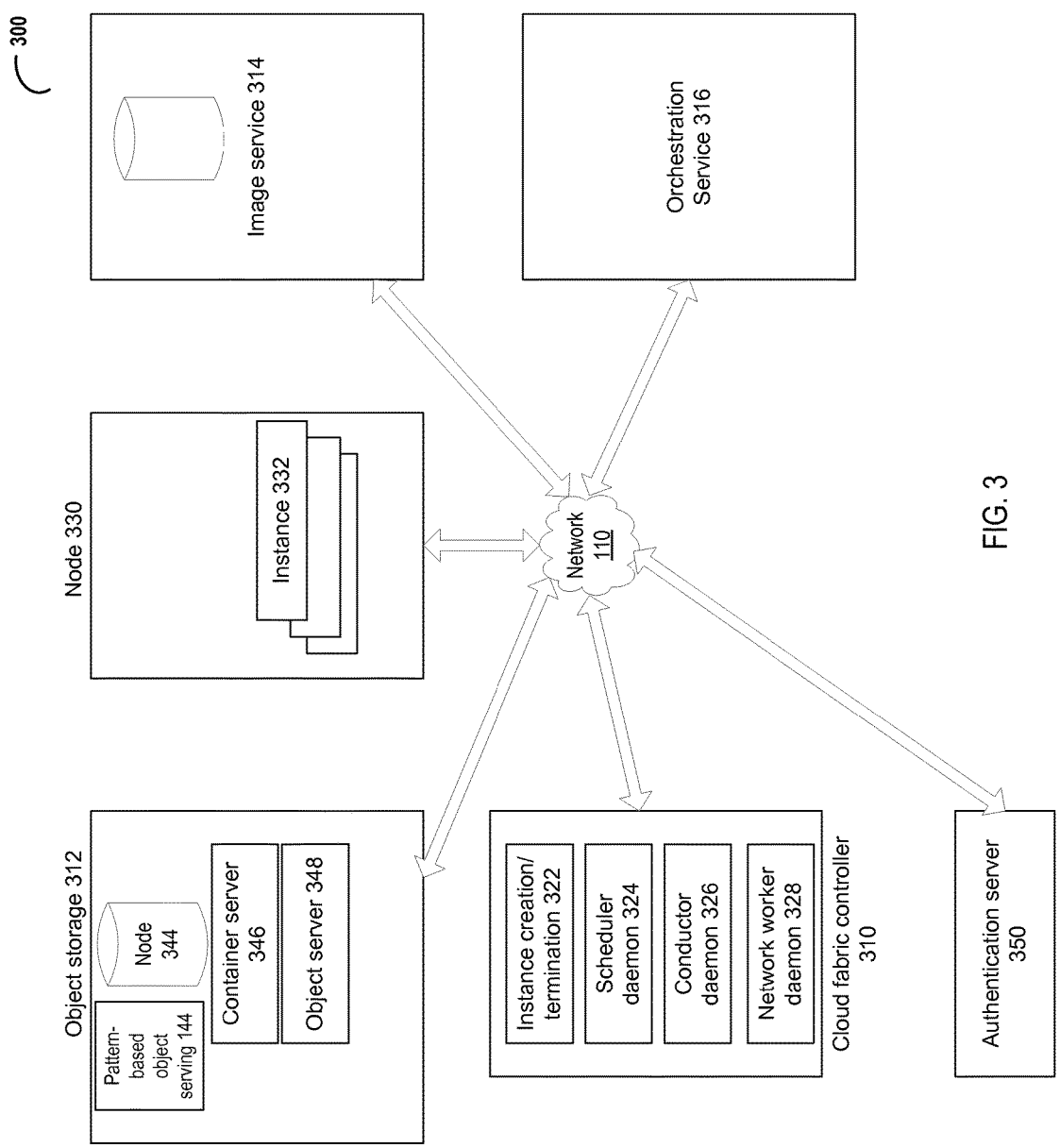
FIG. 3 depicts a component diagram of an example cloud computing platform implementing an example method for pattern-based object serving, in accordance with one or more aspects of the present disclosure.

In certain implementations, the above described pattern-based object serving logic may be implemented by a cloud computing platform, as schematically illustrated by FIG. 3. FIG. 3 depicts a component diagram of an example cloud computing platform, in accordance with one or more aspects of the present disclosure.

In the illustrative example of FIG. 3, cloud computing platform 300 implements OpenStack platform. Cloud computing platform 300 may comprise a cloud fabric controller service 310, an object storage service 312, an image service 314, and an orchestration service 316. While FIG. 3 illustrates each of the above listed services running on a dedicated hardware server, in certain implementations, two or more of those services may be collocated on a single hardware server. The servers executing the above listed services may be interconnected by one or more networks 110, including one or more local area networks, one or more wide area networks, or any combination thereof.

Object storage service 312 may provide a multi-tenant object-based storage system for large amounts of unstructured data. In certain implementations, object storage service 312 may implement a REST-compliant application programming interface (API). In an illustrative example, HTTP protocol may be used as the transport layer for the API. In an illustrative example, object storage service 312 may comprise one or more storage nodes 344, one or more container servers 346 to manage mappings of object containers, one or more object servers 348 to manage objects on the storage nodes, and one or more authentication servers 350 to manage accounts defined within the object storage service.

In certain implementations, the above described pattern-based object serving logic may be implemented by the object storage service. In an illustrative example, responsive to receiving an object access request, an object storage server may select, based on the pattern specified by the object-based storage system client, one or more objects, and return one or more object identifiers (e.g., object names or object descriptors) to the requesting client.

Figure 4:
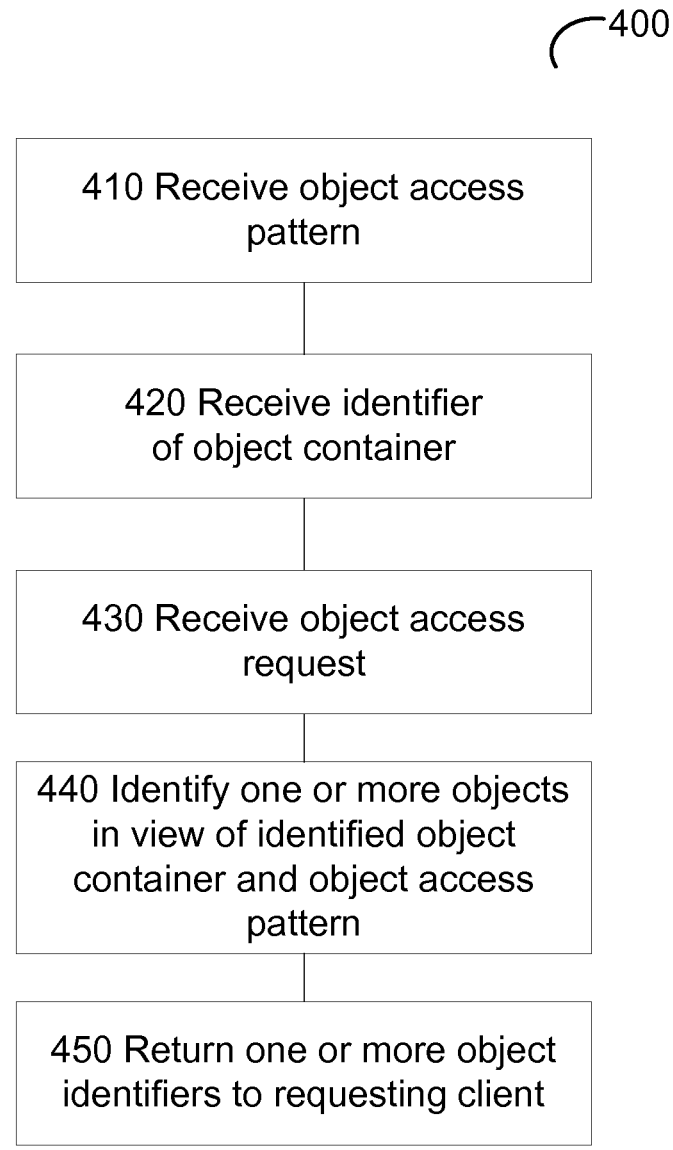
FIG. 4 depicts a flow diagram of an example method for pattern-based object serving, in accordance with one or more aspects of the present disclosure.

FIG. 4 depicts a flow diagram of an example method 400 for pattern-based object serving. Method 400 and/or each of its individual functions, routines, subroutines, or operations may be performed by one or more processing devices of the computer system (e.g., file server 140 of FIG. 1) executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a processing device that executes a component implementing the method (e.g., a file system component or an object-based storage system component) may receive an object access pattern to be associated with object access requests by a client (e.g., a file system client or an object-based storage system client). In an illustrative example, a component implementing method 400 may be provided by a file system server. In another illustrative example, a component implementing method 400 may be provided by an I/O request translator of a distributed file system. In yet another illustrative example, a component implementing method 400 may be provided by an object storage service of a cloud computing system.

In various illustrative examples, the object access pattern may comprise a regular expression and/or one or more wildcard characters, as described in more details herein above.

At block 420, the processing device may receive an identifier of an object container (e.g., the root directory) to be associated with object access requests by the client. In certain implementations, the object access pattern and/or the container may be specified by the client as system call parameters. Alternatively, the object access pattern and/or the object container may be specified by the client in a configuration file.

At block 430, the processing device may receive an object access request from the client. The object access request may be implemented as a dedicated pattern-based object access system call or an ioctl call with a certain request code indicating pattern-based object access.

At block 440, the processing device may identify one or more objects (such as files or objects stored by an object-based storage system) in view of the specified object container and the object access pattern.

At block 450, the processing device may return one or more object identifiers to the file system client. In various illustrative examples, an object identifier may be provided by a file descriptor, a file name, or an object name, as described in more details herein above. Upon completing the operations referenced by block 450, the method may terminate.

Figure 5:
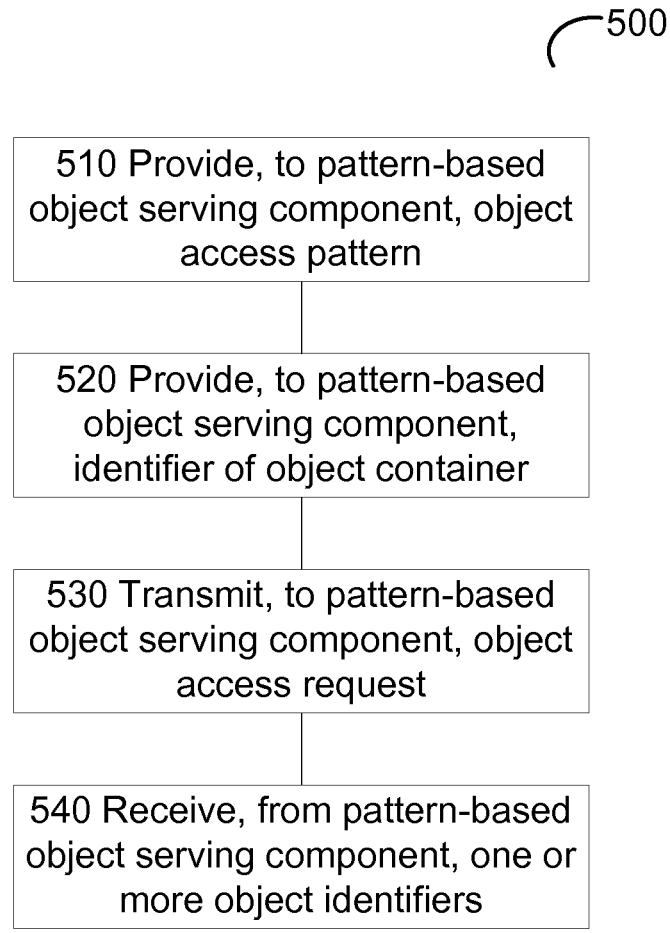
FIG. 5 depicts a flow diagram of an example method 500 for consuming pattern-based object service by a file system client or an object-based storage system client.

FIG. 5 depicts a flow diagram of an example method 500 for consuming pattern-based object service by a file system client or an object-based storage system client, in accordance with one or more aspects of the present disclosure. Method 500 and/or each of its individual functions, routines, subroutines, or operations may be performed by one or more processing devices of the computer system (e.g., client computer system 120 of FIG. 1) executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms).

Alternatively, the processing threads implementing method 500 may be executed asynchronously with respect to each other.

At block 510, a processing device implementing the method may provide, to a pattern-based file serving component (e.g., represented by a file system server or an object storage server), an object access pattern to be associated with object access requests by the client (e.g., a file system client or an object-based storage system client). In various illustrative examples, the object access pattern may comprise a regular expression and/or one or more wildcard characters, as described in more details herein above.

At block 520, the processing device may provide, to a pattern-based object serving component, an identifier of an object container (e.g., the root directory) to be associated with object access requests by the client. In certain implementations, the object access pattern and/or the object container may be specified by the client as system call parameters. Alternatively, the object access pattern and/or the object container may be specified by the client in a configuration file.

At block 530, the processing device may transmit an object access request to the pattern-based object serving component. The object access request may be implemented as a dedicated pattern-based object access system call or an ioctl call with a certain request code indicating pattern-based object access.

At block 540, the processing device may receive, from the pattern-based object serving component, one or more file identifiers. In various illustrative examples, an object file identifier may be provided by a file descriptor, a file name, or an object name, as described in more details herein above. Upon completing the operations referenced by block 540, the method may terminate.

Figure 6:
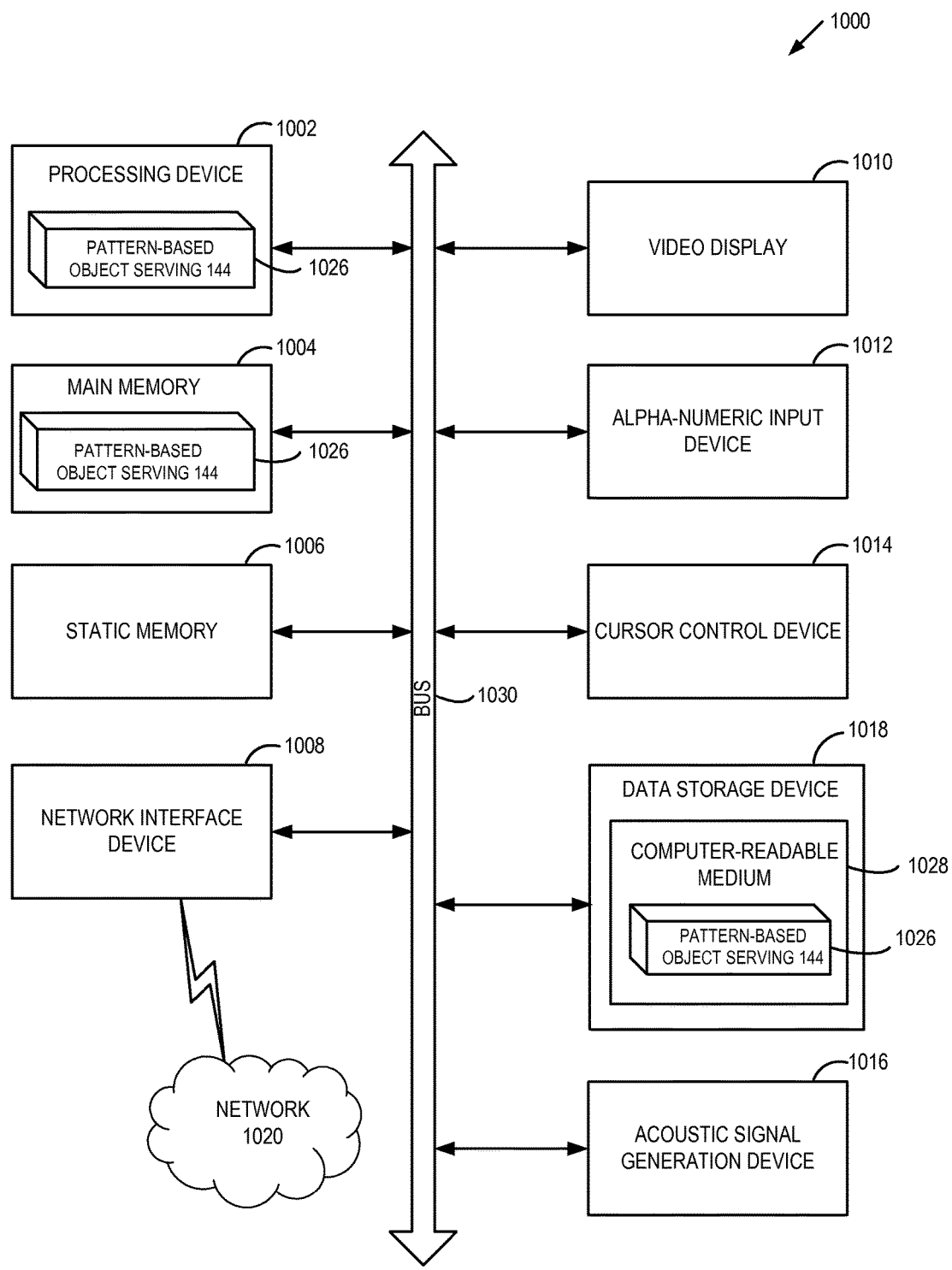
FIG. 6 schematically illustrates a component diagram of an example computer system which can perform any one or more of the methods described herein.

FIG. 6 schematically illustrates a component diagram of an example computer system 1000 which can perform any one or more of the methods described herein. In various illustrative examples, computer system 1000 may correspond to file server computer system 140, computer system 120 of FIG. 1, and/or object storage server 312 of FIG. 3.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute software component 144 implementing method 400 for pattern-based object serving.

Example computer system 1000 may further comprise a network interface device 1008, which may communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of software component 144, including method 400 for pattern-based object serving.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
    transmitting, to a client, system topology information describing a file system configuration graph comprising a root node corresponding to a mount point of a file system, a plurality of terminal nodes corresponding to file system servers, and a plurality of intermediate nodes implementing a plurality of input/output (I/O) request translators;
    receiving, by an I/O request translator of the plurality of I/O request translators, an identifier of an object container and an object access pattern, wherein the object access pattern specifies an order of object retrieval from the object container, and wherein the object access pattern is defined using a regular expression applied to at least one of: a name of the object or an attribute of the object;
    receiving an object access request from the client;
    servicing the object access request by traversing the file system configuration graph following a route from a terminal node to the mount point, wherein servicing the object access request comprises selecting an object in view of the object container and the object access pattern; and
    providing an identifier of the object to the client.

2. The method of claim 1, wherein the object is provided by one of: a file or an object-based storage system object.

3. The method of claim 1, wherein the object container is provided by one of: a root directory of a file system or a container of an object-based storage system.

4. The method of claim 1, wherein the identifier of the object comprises at least one of: a descriptor associated with the object or an object name associated with the object.

5. The method of claim 1, wherein the object access pattern further comprises a wildcard character.

6. The method of claim 1, wherein receiving the object access pattern comprises reading a configuration file.

7. The method of claim 1, wherein receiving the object access pattern comprises parsing parameters of a system call.

8. The method of claim 1, wherein receiving the identifier of the object container comprises reading a configuration file.

9. The method of claim 1, wherein receiving the identifier of the object container comprises parsing parameters of a system call.

10. The method of claim 1, wherein receiving an object access request comprises processing a system call.

11. A system, comprising:
    a memory; and
    a processing device, communicatively coupled to the memory, the processing device to:
      transmit, to a client, system topology information describing a file system configuration graph comprising a root node corresponding to a mount point of a file system, a plurality of terminal nodes corresponding to file system servers, and a plurality of intermediate nodes implementing a plurality of input/output (I/O) request translators;
      receive, by an I/O request translator of the plurality of I/O request translators, an identifier of an object container and an object access pattern, wherein the object access pattern specifies an order of object retrieval from the object container, and wherein the object access pattern is defined using a regular expression applied to at least one of: a name of the object or an attribute of the object;
      receive an object access request from the client;
      service the object access request by traversing the file system configuration graph following a route from a terminal node to the mount point, wherein servicing the object access request comprises selecting an object in view of the object container and the object access pattern; and
      providing an identifier of the object to the client.

12. The system of claim 11, wherein the object is provided by one of: a file or an object-based storage system object.

13. The system of claim 11, wherein the object container is provided by one of: a root directory of a file system or a container of an object-based storage system.

14. The system of claim 11, wherein receiving the object access pattern comprises at least one of: reading a configuration file or parsing parameters of a system call.

15. The system of claim 11, wherein receiving the identifier of the object container comprises at least one of: reading a configuration file or parsing parameters of a system call.

16. A non-transitory computer-readable storage medium comprising executable instructions that, when executed by a processing device, cause the processing device to perform operations, comprising:
   transmitting, to a client, system topology information describing a file system configuration graph comprising a root node corresponding to a mount point of a file system, a plurality of terminal nodes corresponding to file system servers, and a plurality of intermediate nodes implementing a plurality of input/output (I/O) request translators;
   receiving, by an I/O request translator of the plurality of I/O request translators, an identifier of an object container and an object access pattern, wherein the object access pattern specifies an order of object retrieval from the object container, and wherein the object access pattern is defined using a regular expression applied to at least one of: a name of the object or an attribute of the object;
   receiving an object access request from the client;
   servicing the object access request by traversing the file system configuration graph following a route from a terminal node to the mount point, wherein servicing the object access request comprises selecting an object in view of the object container and the object access pattern; and
   providing an identifier of the object to the client.

17. The non-transitory computer-readable storage medium of claim 16, wherein the object is provided by one of: a file or an object-based storage system object.

18. The non-transitory computer-readable storage medium of claim 16, wherein the object container is provided by one of: a root directory of a file system or a container of an object-based storage system.

19. The non-transitory computer-readable storage medium of claim 16, wherein receiving the object access pattern comprises at least one of: reading a configuration file or parsing parameters of a system call.

20. The non-transitory computer-readable storage medium of claim 16, wherein receiving the identifier of the object container comprises at least one of: reading a configuration file or parsing parameters of a system call.

* * * * *